(12) United States Patent
Beale et al.

(10) Patent No.: US 7,038,419 B1
(45) Date of Patent: May 2, 2006

(54) COMPRESSOR DRIVE

(75) Inventors: Alan Beale, South Wales (GB);
Stephen John Cook, Reading (GB);
Michael David Newton, South Wales (GB)

(73) Assignee: Huntleigh Technology, PLC (GB)

( * ) Notice: Subject to any disclaimer, the term of this patent is extended or adjusted under 35 U.S.C. 154(b) by 384 days.

(21) Appl. No.: 09/806,713

(22) PCT Filed: Jul. 28, 2000

(86) PCT No.: PCT/GB00/02931
§ 371 (c)(1),
(2), (4) Date: Jun. 25, 2001

(87) PCT Pub. No.: WO01/09695
PCT Pub. Date: Feb. 8, 2001

(30) Foreign Application Priority Data
Jul. 31, 1999 (GB) .............................. 9917961

(51) Int. Cl.
*G05B 11/28* (2006.01)

(52) U.S. Cl. .................... 318/599; 318/139; 73/168
(58) Field of Classification Search ............. 128/202.22, 128/204.21, 205.27; 604/146; 73/168; 318/139, 318/599
See application file for complete search history.

(56) References Cited

U.S. PATENT DOCUMENTS

| 4,806,833 | A | | 2/1989 | Young ................... 318/335 |
|---|---|---|---|---|
| 4,905,687 | A | | 3/1990 | Ponkala ................ 128/204.21 |
| 5,022,587 | A | | 6/1991 | Hochstein .................... 239/72 |
| 5,107,713 | A | | 4/1992 | Peck et al. .............. 73/863.02 |
| 5,448,141 | A | * | 9/1995 | Kelley et al. ................ 318/254 |
| 5,599,174 | A | | 2/1997 | Cook et al. .............. 417/413.1 |
| 5,632,155 | A | * | 5/1997 | Sugiyama et al. |
| 5,671,730 | A | | 9/1997 | Ollila ................... 128/204.21 |
| 5,736,823 | A | | 4/1998 | Nordby et al. ............. 318/432 |
| 6,118,239 | A | * | 9/2000 | Kadah |
| 6,132,010 | A | * | 10/2000 | Holt et al. |
| 6,206,652 | B1 | * | 3/2001 | Caillat |

FOREIGN PATENT DOCUMENTS

| GB | 2 253 099 | 8/1992 |
|---|---|---|
| JP | 2223683 | 9/1990 |

* cited by examiner

*Primary Examiner*—Jeffrey W Donels
(74) *Attorney, Agent, or Firm*—Brown Raysman Millstein Felder & Steiner LLP

(57) ABSTRACT

A fluid flow control system for an electromagnetic pump having an electromagnetic drive (11) and a compressor (6). The control system established a required current in the compressor coils (10) to control the position and movement of the actuator (11), the actuator deflecting a diaphragm within the pump to provide the required flow. The control system includes a command signal generator (1) to create a signal representing the required flow. The signal is applied to a command processor (2) with any feedback signals (13) for example, coil current and/or actuator displacement. The command processor (2) calculates the appropriate drive signal defined by mark-space ratio, repetition rate, and amplitude. The drive signal controls the voltage supplied to the compressor coils (11) resulting in a required coil current to provide the desired flow. A dc power supply is used to avoid problems regarding main power supply and frequency.

10 Claims, 4 Drawing Sheets

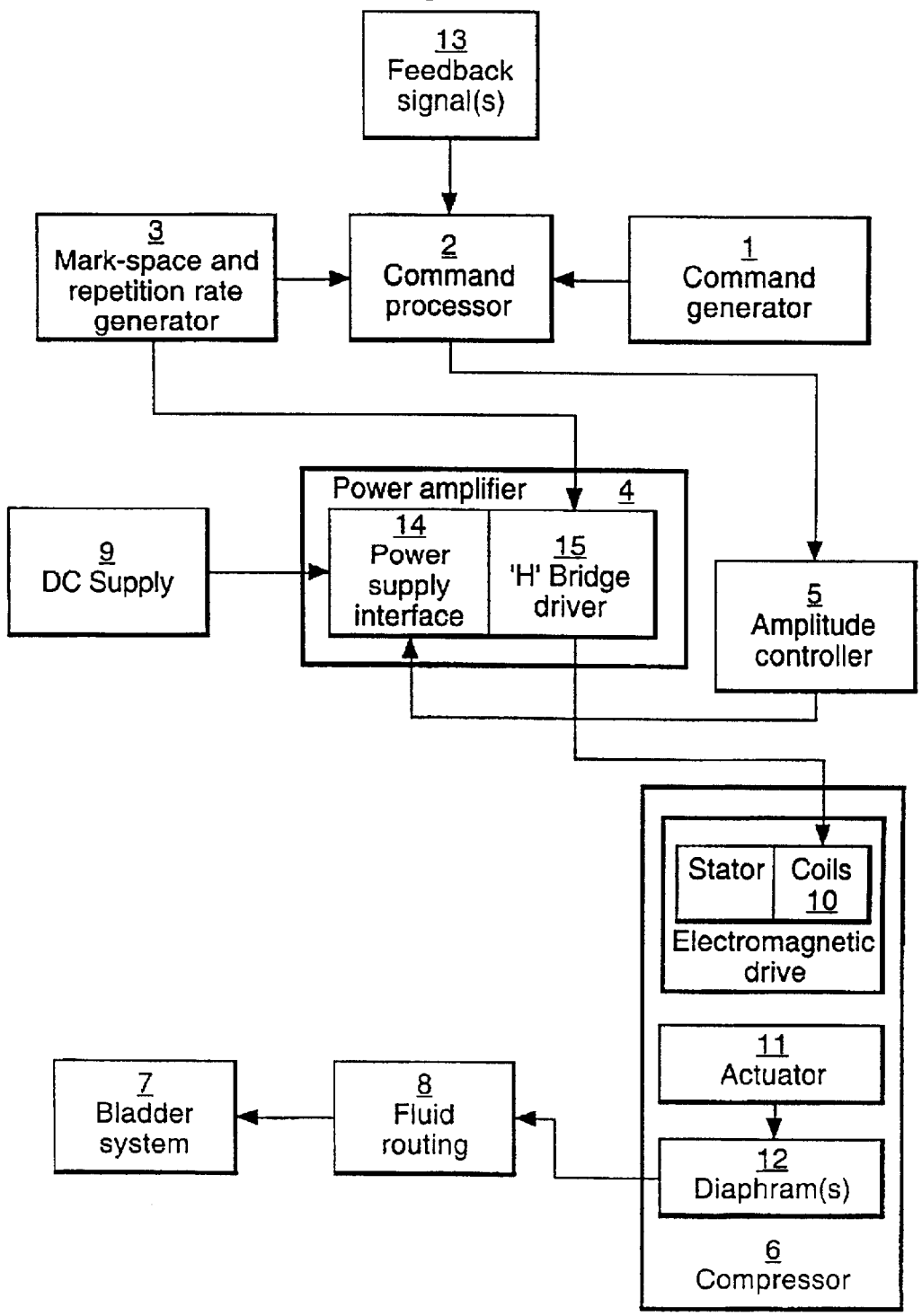

COMPRESSOR DRIVE

FIELD OF THE INVENTION

The present invention relates to a fluid flow control system and particularly a fluid flow control system for an electromagnetic pump which can provide any desired variable fluid flow rate.

BACKGROUND OF THE INVENTION

Conventionally electromagnetic pumps operate from mains power and the compressors within the electromagnetic pumps operate directly from this single phase mains power which provides the compressor electrical drive input voltage and frequency. Therefore these compressors operate at constant fluid flow, and any fluid flow control depends merely on on/off control or on fluid loading conditions. The necessary fluid flow rates are obtained by the control and design of the fluid routing system.

Such compressors include linear or arcuate motion reciprocating actuators driven by electromagnetic drive means supplied by the mains power voltage and frequency. The electromagnetic drive means drive the actuators into reciprocating mechanical motion which is translated by diaphragms and valves into fluid flow from one or more compressor inputs to one or more compressor outputs.

This approach has a number of problems including the design of the compressor having to vary with the value of mains power voltage and frequency, complicating manufacture and driving up costs. Furthermore, flow control only by air routing compromises the compressors' life, the compressors having to be operated continually at maximum capacity with the consequence of maximum noise and vibration during use.

Furthermore, the performance of the compressors is largely dependent on the mechanical characteristics of its components, for example the diaphragm stiffness, the moving mass, and also the stiffness of the compressed air within the pump.

Any variation either between units of manufacture or within environmental operating conditions or through use will cause additional performance variation.

Thus, those skilled in the art have long recognized the need for a fluid flow control system for an electromagnetic pump that is not dependent on the voltage and frequency of the mains power supply and provides the desired fluid flow with the optimum performance of the pump.

SUMMARY OF THE INVENTION

Accordingly, the present invention provides a fluid flow control system for an electromagnetic pump comprising electromagnetic drive means within a compressor, the control system supplying a pulse width modulated drive signal to the electromagnetic drive means so as to supply a predetermined pump flow rate, the drive signal generated from a dc voltage supply.

Preferably, the pulse width modulated drive signal comprises a train of variable mark space ratio pulses with defined repetition rates and amplitude. By varying the mark space ratio with time and appropriately defining its repetition rate and amplitude a drive signal compatible with the required flow rate can be obtained.

Preferably, the electromagnetic drive means includes stator(s) of magnetic material, excitation winding(s) for magnetically exciting the stator(s) and a movable magnetic member connected to the actuator of the compressor. An actuator deflection results in a corresponding deflection of the attached diaphragm(s) and in flow of any fluid in contact with the diaphragms.

Preferably, the electromagnetic drive means in combination with diaphragms provides a conversion of electrical energy to fluid flow.

Preferably, the pulse width modulated drive signal controls the instantaneous current within the excitation windings. This current by controlling actuator deflection amplitude and repetition rate controls fluid flow within the compressor.

Preferably the mark-space ratio of the drive signal defines with time an approximate half sinewave waveform.

Preferably, the pulse width modulated drive signal is of substantially constant amplitude. Pulse width modulated control from a dc power supply ensures the compressor is always operating with optimum efficiency for any application, the compressor performance being independent of mains power type or variations and allowing the possibility of using batteries to operate the pumps. Therefore, the problems associated with existing fixed frequency mains voltage driven compressors and pumps are avoided.

According to a further aspect of the present invention, there is provided a fluid flow control system for an electromagnetic pump comprising electromagnetic drive means within a compressor, the control system supplying a pulse width modulated low voltage drive signal of substantially fixed amplitude to the electromagnetic drive means to control the amplitude and repetition rate of the current in the coils of the electromagnetic drive means to drive the actuator in order to generate a desired flow rate output from the compressor.

Preferred embodiments of the present invention will now be described in detail by way of example only, with reference to the accompanying drawings of which:

BRIEF DESCRIPTION OF THE DRAWINGS

FIG. 1 shows a block diagram of the fluid flow control system according to the present invention;

DETAILED DESCRIPTION OF THE PREFERRED EMBODIMENTS

Figure 2A:
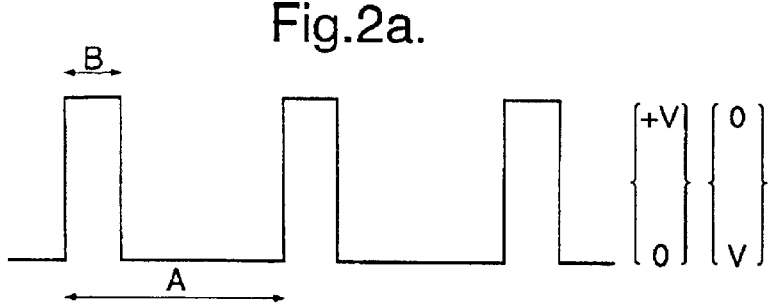
FIG. 2a shows the bipolar voltage drive signal.

Referring to the block diagram at FIG. 1 there is shown a controlled fluid flow system comprising a control system, fluid routing, a bladder system (7) and a compressor comprising one or more diaphragms (12) attached to an electromagnetic actuator (11).

The control system establishes a required current in the compressor (6) coil or coils (10) at any instant in time. The coil current controls the position of the actuator (11) which deflects the diaphragm(s) (12) appropriately thereby providing flow of any fluid in contact with the diaphragms) (12). Controlling the current in the coil(s) (10) controls the fluid flow from the compressor (6).

A command signal representing the required fluid flow is created in the command generator (1) and applied to the command processor (2) in conjunction with any feedback signal(s) (13) derived from the coil current sensor, actuator position sensor, bladder flow sensor and bladder pressure sensor. They provide signals representing instantaneous coil current, actuator displacement flow into or out of the bladder system (7) and bladder system (7) pressure.

The output of the command generator (1) and the feedback signals (13) are processed in the command processor (2) using a control algorithm which is representative of the pneumatic, mechanical and electrical characteristics of the compressor that is to be driven. From the control algorithm an appropriate drive signal is calculated, defined by mark-space ratio, repetition rate and amplitude parameters.

Drive signal amplitude is obtained via the amplitude controller (5) appropriately changing the power supply interface (14) within the power amplifier (4) to change the dc supply voltage of the 'H' bridge driver (15). The drive signal mark-space ratio and repetition rate are obtained by the mark-space and repetition rate generator operating on the appropriate parameter values. The generator provides a unipolar drive signal to the 'H' bridge driver (15) which then provides a bipolar voltage drive signal to the compressor coil(s) (10).

This bipolar voltage drive signal (FIG. 2a) across the compressor coils may be represented by repetition rate 51/A, mark-space ratio B/A and amplitude switching between +V and –V. V is a voltage closely approximating the supply voltage to the 'H' bridge driver (15). Typically V might be around 12 volts with a repetition rate of several kilohertz and mark-space ratio varying from below one per cent to above 99 percent.

Figure 2B:
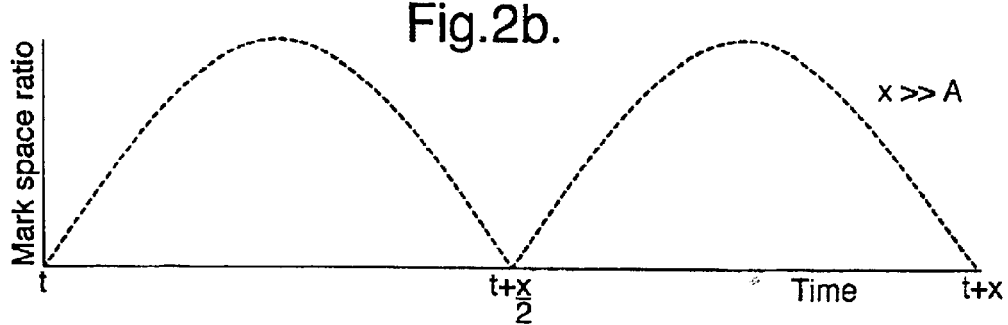
FIG. 2b shows the unipolar drive signal from the mark space/repetition rate generator.
Figure 2C:
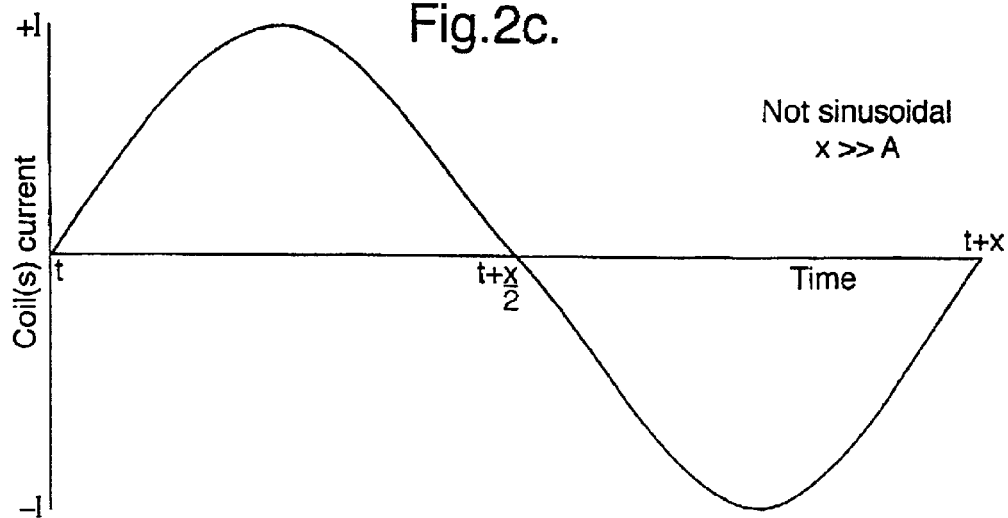
FIG. 2c shows actuator current.

If for the purposes of obtaining appropriate compressor fluid flow an actuator current of period x is a required (FIG. 2c) then over a time period of x the generator (3) will provide mark-space ratio values approximating two half sinusoids (FIG. 2b), each over a period of x/2 and with uniform repetition rate. This drive signal combined with the switching action of the 'H' bridge driver (FIG. 2-a) will create a complete bipolar near sinusoidal actuator coil current with a period of x as required. Typically x will be ten to a hundred times greater than A requiring a drive signal repetition rate equally much higher than 1/x.

The bipolar current in the compressor coil(s) enables the actuator to be displaced both positively and negatively with respect to its non-energised position. The actuator displacement results in the fluid pumping diaphragms (12) being deflected to the required amount to provide the required flow rate of the fluid. The power amplifier (4) is supplied from mains power via a regulated or unregulated dc supply or from a dc battery.

It will be apparent to skilled practitioners of the art that for the invention except where indicated otherwise the command generator, mark-space and repetition rate generator, command processor, dc supply, power amplifier and amplitude controller can be implemented in any combination of analogue circuitry, digital circuitry or state machines including microprocessor systems.

It will also be apparent to skilled practitioners of the art that instead of diaphragms one can use other air displacement devices such as pistons, vanes, spirals, and that fluid flow out of as well as into the bladder system can be controlled.

Figure 3:
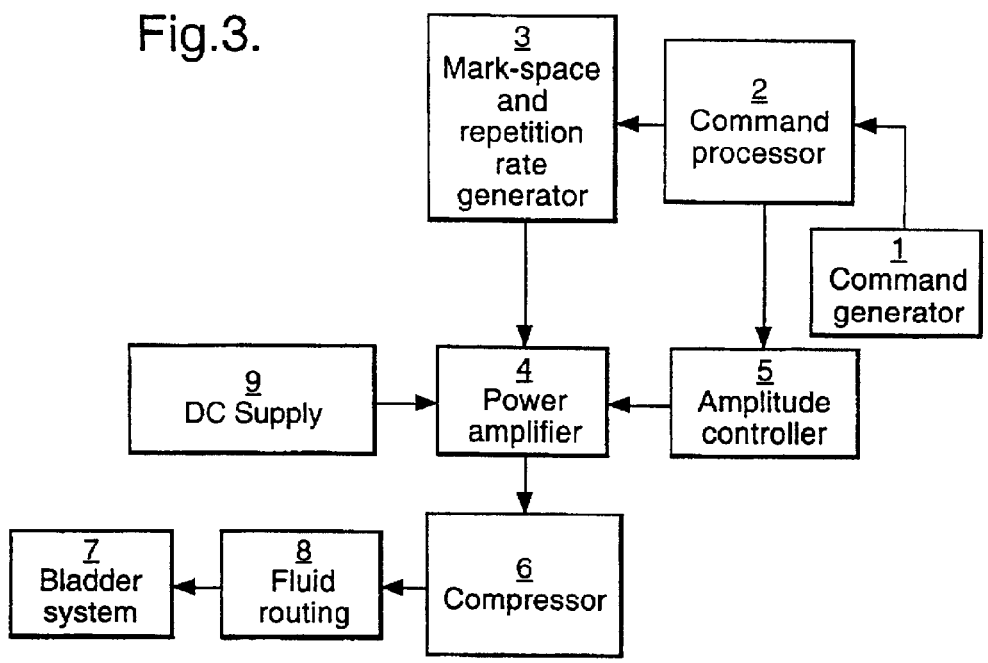
FIG. 3 shows a block diagram of one embodiment of a control system of FIG. 1 supplying fluid to a bladder.

FIG. 3 shows a preferred embodiment of the invention where the characteristics of the compressor output fluid flow are known for varying loads, temperatures and pressures. In this case, a command signal representing the required fluid flow is created in the command generator (1) and applied to the command processor (2). The command processor (2) determines the repetition rate and mark-space ratio required from the mark-space and repetition rate generator (3) This results in a variable repetition rate and time varying mark-space ratio waveform representative of the current required in the compressor (6) coil or coils. The waveform is applied to the power amplifier (4) where it is controlled in amplitude by the amplitude controller (5), the amplitude being determined by the command processor (2). The output of the power amplifier (4) provides a voltage with the amplitude repetition rate and mark-space ratio controlled by the command processor. This voltage is applied to the compressor (6) coil or coils resulting in a known current, therefore a known deflection of the compressor bellows and thus a known amount of fluid flow to the bladder system (7) by way of the fluid routing system (8). A dc power supply (9) is used.

Figure 4:
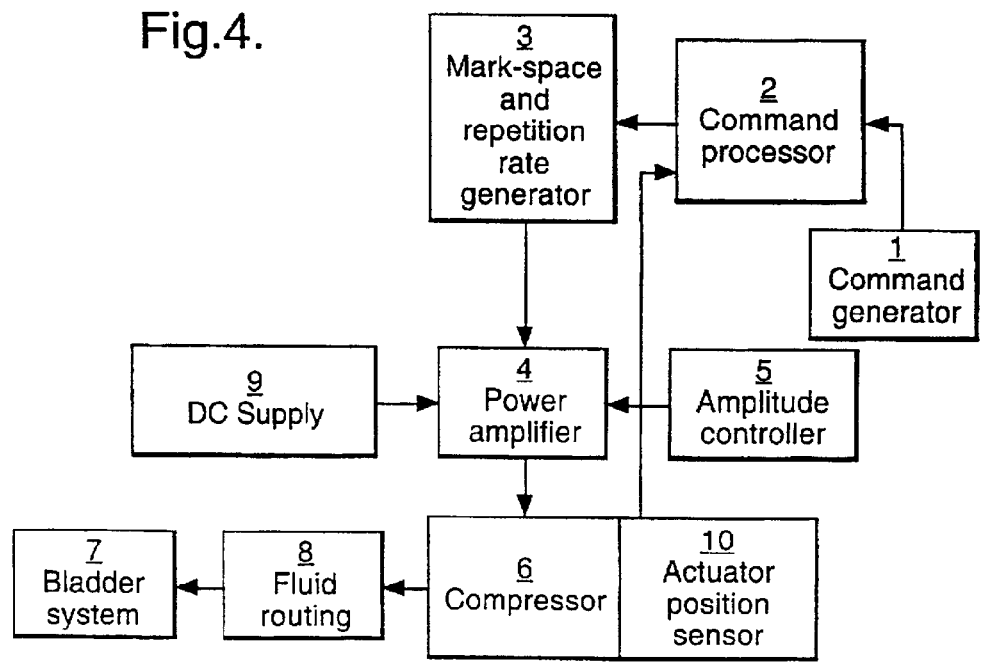
FIG. 4 shows a block diagram of another embodiment of a control system of FIG. 1 supplying fluid to a bladder.

FIG. 4 shows the control of the fluid flow system as described in FIG. 3 but applied to the control of the actuator position within the compressor by actuator position feedback. This control approach removes the effect of unknown variations within the electromagnetic drive means between drive signal and resulting actuator deflection.

A command signal representing the required fluid flow is created in the command generator (1) and added to the actuator position sensor (16) signal in the command processor (2) thus providing an error signal to ensure that the actuator position is achieved. This error signal from the command processor (2) determines the repetition rate and mark-space ratio required from the mark-space and repetition rate generator (3). This results in a variable repetition rate and time varying mark-space ratio waveform representative of the current required in the compressor (6) coil or coils. This waveform is applied to the power amplifier (4) where it is controlled in amplitude by the amplitude controller (5), the amplitude being determined by the command processor (2). The output of the power amplifier (4) provides a voltage with the amplitude repetition rate and mark-space ratio controlled by the command processor (2) and the actuator position sensor (16). This voltage is applied to the compressor (6) coil or coils resulting in a known deflection of the compressor bellows and thus a known amount of fluid flow to the bladder system (7) by way of the fluid routing system (8). A dc power supply (9) may also be used.

Figure 5:
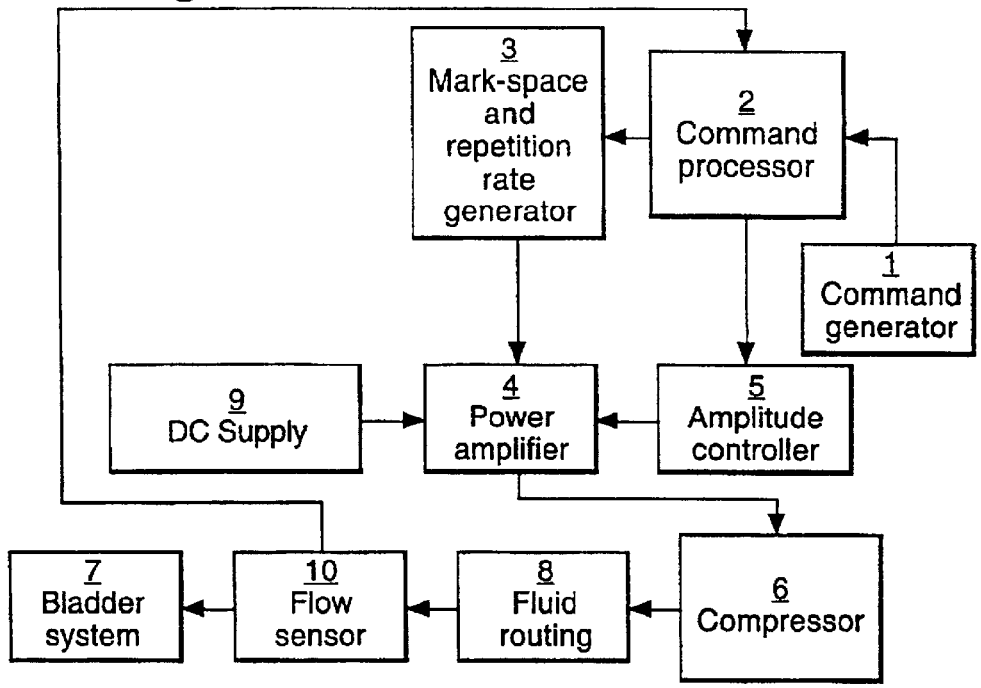
FIG. 5 shows a block diagram of a further embodiment of a control system of FIG. 1 supplying fluid to a bladder.

FIG. 5 shows flow control based on the principle that the actual fluid flow into a bladder is monitored to maintain the required fluid flow.

A command signal representing the required fluid flow is created in the command generator (1) and added to the information from the flow sensor (17) in the command processor (2) thus providing an error signal to correct any error in the required flow. This error signal from the command processor (2) determines the repetition rate and mark-space ratio required from the mark-space and repetition rate generator (3). This results in a variable repetition rate and time varying mark-space ratio waveform representative of the current required in the compressor (6) coil or coils. This waveform is applied to the power amplifier (4) where it is controlled in amplitude by the amplitude controller (5), the amplitude being determined by the command processor (2). The output of the power amplifier (4) provides a voltage with the amplitude repetition rate and mark-space ratio controlled by the command processor (2) and the flow sensor (17). This voltage is applied to the compressor (6) coil or coils resulting in a deflection of the compressor bellows and thus an amount of fluid flow to the bladder system (7) by way of the fluid routing system (8). Any errors in the flow being detected by the flow sensor (17) and being used as a correction signal into the command processor (2). A dc power supply (9) is used.

Figure 6:
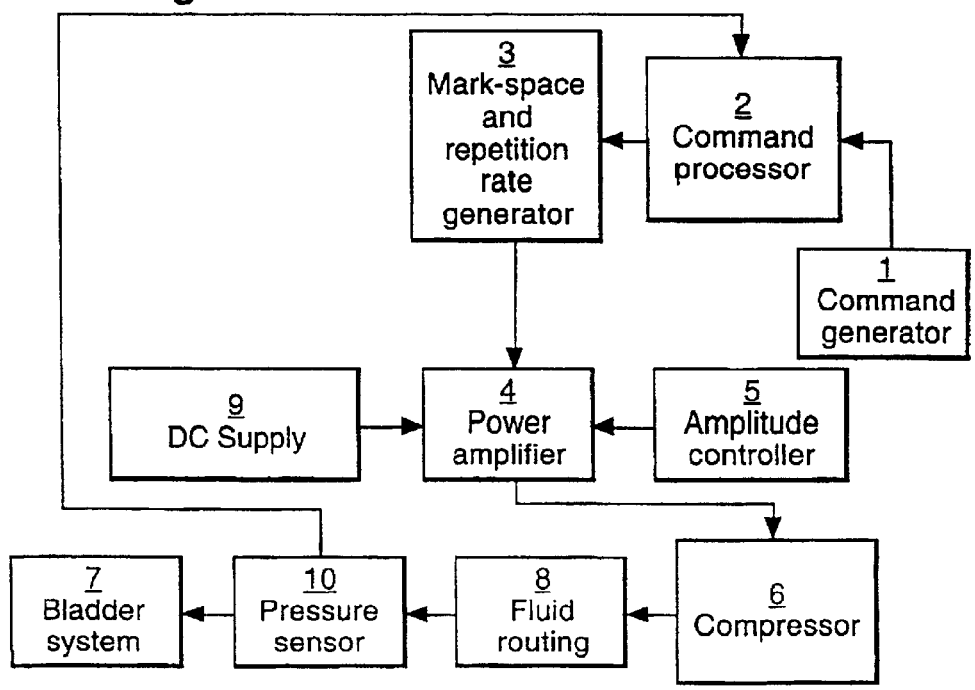
FIG. 6 shows a block diagram of a further embodiment of a control system of FIG. 1 supplying fluid to a bladder.

Alternatively, instead of flow being monitored, the actual pressure in the bladder may be monitored as shown in FIG. 6.

Referring to FIG. 6, a command signal representing the required bladder pressure is created in the command generator (1) and added to the information from the pressure sensor (18) in the command processor (2) thus providing an error signal that can be used to correct any error in the required bladder system (7) pressure. This error signal from the command processor (2) determines the repetition rate and mark-space ratio required from the mark-space and repetition rate generator (3). This results in a variable repetition rate and time varying mark-space ratio waveform representative of the current required in the compressor (6) coil or coils. This waveform is applied to the power amplifier (4) where it is controlled in amplitude by the amplitude controller (5), the amplitude being determined by the command processor (2). The output of the power amplifier (4) provides a voltage with the amplitude repetition rate and mark-space ratio controlled by the command processor (2) and the pressure sensor (18). This voltage is applied to the compressor (6) coil or coils resulting in a deflection of the compressor bellows and thus an amount of fluid flow to the bladder system (7) by way of the fluid routing system (9). Any errors in the pressure detected by the pressure sensor (18) is then used as a correction signal into the command processor (2). A dc power supply is used (9). Furthermore, the various embodiments described above are provided by way of illustration only and should not be construed to limit the invention. Those skilled in the art will readily recognize various modifications and changes may be made to the present invention without departing from the true spirit and scope of the present invention. Accordingly, it is not intended that the invention be limited, except as by the appended claims.

What is claimed is:

1. A fluid flow control system for an electromagnetic pump, the control system comprising:
   an electromagnetic drive within a compressor, wherein the control system supplies a pulse width modulated drive signal to the electromagnetic drive so as to provide a predetermined pump flow rate, wherein the drive signal is generated by a dc voltage supply; and at least one diaphragm, wherein the electromagnetic drive is operatively associated with the at least one diaphragm to provide conversion of electrical energy to fluid flow.

2. A fluid flow control system for an electromagnetic pump, the control system comprising:
   an electromagnetic drive within a compressor, wherein the control system supplies a pulse width modulated drive signal to the electromagnetic drive so as to provide a predetermined pump flow rate, wherein the drive signal is generated by a dc voltage supply, wherein the drive signal includes a mark-space ratio, and wherein the mark-space ratio of the drive signal defines over time an approximate half sine wave current waveform.

3. A fluid flow control system for an electromagnetic pump, the control system comprising:
   an electromagnetic drive within a compressor, wherein the control system further comprises:
   a command generator that creates a command signal corresponding to a predetermined desired fluid flow rate;
   at least one sensor to ascertain the status of the system and provide at least one feedback signal;
   wherein the command signal and the at least one feedback are processed by a command processor, wherein the command processor outputs a drive signal defined by a mark-space ratio, a repetition rate, and an amplitude, and wherein the drive signal controls voltage applied to compressor windings.

4. The fluid flow control system of claim 3, wherein the at least one sensor provides feedback to the command processor regarding instantaneous coil current.

5. The fluid flow control system of claim 3, wherein the at least one sensor provides feedback to the command processor regarding actuator displacement.

6. The fluid flow control system of claim 3, wherein the at least one sensor provides feedback to the command processor regarding bladder system pressure.

7. The fluid flow control system of claim 3, wherein the at least one sensor provides feedback to the command processor regarding bladder system fluid flow.

8. A fluid flow control system for an electromagnetic pump, the control system comprising:
   an electromagnetic drive within a compressor, the electromagnetic drive comprising an actuator attached to a diaphragm, wherein the control system supplies a pulse width modulated drive signal to the electromagnetic drive to provide linear deflection of the actuator and resultant deflection of the diaphragm to generate a desired flow rate output from the compressor.

9. The fluid flow control system of claim 8, wherein the pulse width modulated drive signal is of substantially fixed amplitude.

10. The fluid flow control system of claim 8, wherein the actuator comprises a movable magnetic member and the electromagnetic drive comprises excitation windings, and wherein the deflection of the actuator is controlled by current in the excitation windings.

* * * * *